April 30, 1940.    R. K. LEE    2,198,672
MOTOR MOUNTING
Filed Jan. 19, 1934
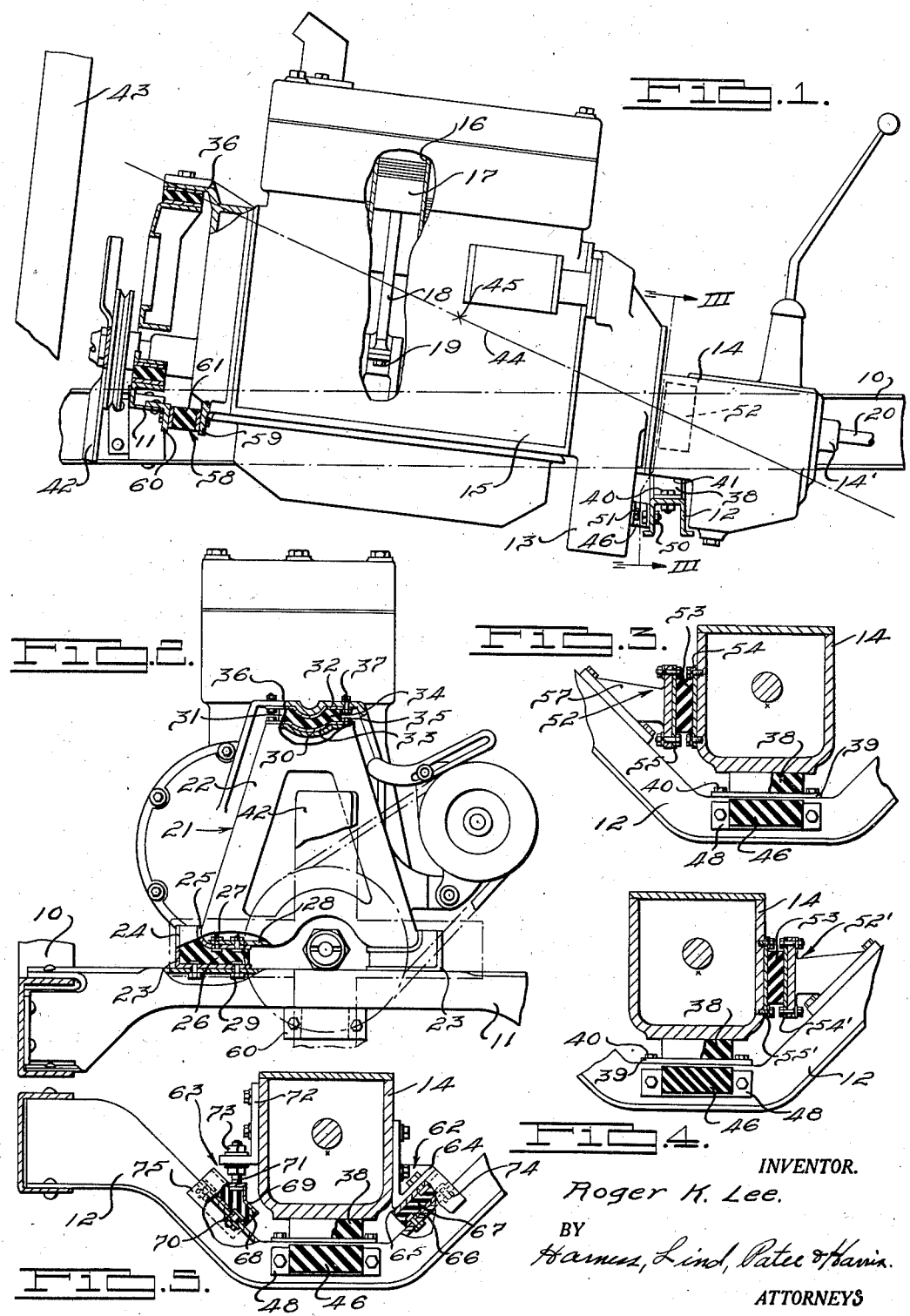
INVENTOR.
Roger K. Lee.
BY
Harness, Lind, Patee & Harvin.
ATTORNEYS Patented Apr. 30, 1940

2,198,672

UNITED STATES PATENT OFFICE 2,198,672

MOTOR MOUNTING

Roger K. Lee, Highland Park, Mich., assignor to Chrysler Corporation, Detroit, Mich., a corporation of Delaware Application January 19, 1934, Serial No. 707,319

2 Claims. (Cl. 248—7)

This invention relates to an improved type and arrangement of supporting and movement controlling devices for reciprocating piston type engines, such as internal combustion engines for use in propelling vehicles, and it has particular relation to a novel form and arrangement of engine mounting members which permit controlled movement of the engine or the engine unit.

More specifically, my invention provides a means for yieldably supporting an engine unit in forwardly inclined relationship to a horizontal plane and in such manner that it may oscillate, under the influence of the torque reaction impulse thereof, about an axis passing approximately through the center of mass of the engine unit and extending at a comparatively large inclination to a horizontal plane.

One of the main objects of the invention is to provide a mounting for oscillatively supporting an engine unit of the character indicated on an axis which extends substantially through the center of mass of the unit so as to prevent displacement of the center of mass during oscillation of the unit under the influence of the torque reaction impulses.

Another object of the invention is to provide a mounting of this character which maintains the engine unit in a forwardly inclined relationship to the plane of a chassis frame of a vehicle and which positions the front end of the engine in spaced relation to the chassis frame structure so as to accommodate the auxiliary engine equipment and to position a crank shaft supported fan of an engine cooling system in registration with the radiator core of the system.

Another object of the invention consists in the provision of an improved construction and arrangement of resilient non-metallic means having sound insulating properties in the supporting and movement controlling devices of a mounting of this character, by which the transmission of sound vibrations from the engine unit to its frame structure is minimized while the desired amplitude of oscillatory movement is permitted without an accompanying excessive freedom of fore and aft and lateral movements of the unit.

Other objects of the invention are to provide an improved abutment having a yieldable element which acts in compression in opposing the tendency of the engine unit to shift, under the influence of its weight, in one direction of its inclined position and which tensionally resists movement of the latter in an opposite direction; and to provide an abutment of this character which is located in close proximity to the vertical plane of the axis of oscillation of the unit and adapted to yieldably oppose forward and rearward movements of the unit without turning the engine with respect to such vertical plane or otherwise displace said axis or causing the various mounting members to be unnaturally stressed.

Further objects of the invention are to provide an engine mounting member between a portion of an engine unit and its frame which includes two or more series related yieldable weight supporting elements having sound insulating properties and an intermediate rigid connecting means; to provide a mounting of this kind in which the transmission of sound vibrations from the engine to its frame are intercepted at spaced locations at opposite extremities of the rigid connecting means; to provide for the placement of part of the yieldable material, required to properly yieldably and oscillatively support an engine unit, at locations where the space required for its accommodation is not highly congested by the structure of the unit and its associated apparatus; to provide series related yieldable weight supporting elements in a mounting member of this kind, one of which is disposed between the engine and the rigid structure of the mounting and adapted to accommodate oscillatory movement of the engine about its axis; to provide laterally spaced yieldable elements between the rigid structure of said mounting member and the frame which are located at a substantial distance from and on opposite sides of the vertical plane of the axis of oscillation of the unit and particularly adapted to yieldably oppose lateral movement of the engine unit and lateral as well as oscillatory movements of the rigid structure of said mounting member; and to provide at spaced locations in the supporting structure between one portion of an engine and its frame, a greater aggregate thickness of yieldable material than the thickness thereof that can normally be tolerated at one location, so as to minimize the transmission of sound vibrations from the engine unit while maintaining the freedom of movement of the unit relative to its frame within desired limits.

Additional objects of the invention are to provide improved means for yieldably opposing oscillatory movement of the engine unit about its axis under the influence of the torque reaction of the engine; to provide means of this character which are free from the weight of the engine and adapted to limit transverse movement of the rear and front ends thereof; to provide combined torque reaction and transverse movement opposing means which have resilient, non-metallic material interposed between and attached to the engine unit and frame respectively at longitudinally spaced locations on the unit; and to provide means of this character which are independent of the fore and aft engine movement controlling means and constructed and arranged in such a manner as to permit the axis of oscillation of the engine unit to remain substantially in the position provided for it by the weight supporting members and associated structure during operation of the engine.

Still further objects of the invention are to provide a pair of angularly disposed torque reaction opposing members, one located on each side of an engine unit and having their resilient elements disposed in oppositely inclined converging planes so as to oppose transverse movement of the engine unit relative to its frame mainly in compression; to provide torque opposing members of this character having resilient, non-metallic material interposed between and attached to the engine unit and frame respectively and normally acting in tension to urge the unit toward the weight supporting elements of the mounting so as to assure freedom of the torque opposing means from the weight of the engine unit as the unit settles due to variations in the permanent set of the weight supporting elements; and to provide conveniently accessible adjusting means for varying the tension of the resilient material of the torque opposing members to compensate for change in the weight supporting devices occasioned by usage, wear and fatigue.

Illustrative embodiments of the invention are shown in the accompanying drawing, in which:

Fig. 1 is a side elevational view of an engine unit mounted according to one form of the invention and showing parts of the mounting structure broken away and in section.

Fig. 2 is a front elevational view of the engine unit and its mounting illustrated in Fig. 1 and showing parts of the mounting structure broken away and in section.

Fig. 3 is a transverse sectional view taken on line III—III of Fig. 1.

Fig. 4 is a transverse sectional view, similar to Fig. 3 but showing a modified form of the invention.

Fig. 5 is a transverse sectional view of a mounting embodying a further development of the invention.

In the form shown, the improved internal combustion engine mounting is illustrated in conjunction with a vehicle chassis frame which includes longitudinally extending channel members 10 and rigid transversely disposed front and rear members 11 and 12, respectively, which are secured to the longitudinal channel members. The transverse frame member 11 is located at the front end of the vehicle chassis frame, and the transverse member 12 is spaced rearwardly therefrom and disposed substantially adjacent the junction of the bell housing 13 and the transmission case 14 of the engine unit. The transmission case and bell housing are rigidly fixed together, and the latter is rigidly fixed to the crank case 15 of the engine unit. These parts of the engine unit are longitudinally aligned with each other and are received between the longitudinal channel members 10.

The internal combustion engine is of the multiple cylinder type, having for the purpose of illustration six aligned cylinders 16, only one of which is shown. Slidably mounted in each cylinder is a reciprocating piston 17 to which is pivotally attached a connecting rod 18, which is journaled on its lower end to a crank shaft 19 in the usual manner. A clutch mechanism (not shown) within the bell housing 13 connects the crank shaft 19 with a transmission mechanism (not shown) within the housing 14 in a conventional manner. The transmission mechanism in turn drives a propeller shaft 20 through a universal or other flexible joint 14'.

Mounted on the front transverse member 11 is a front mounting member 21 comprising an intermediate upstanding substantially A shaped metal support 22. The wide extremity of the A shaped intermediate support 22 is disposed adjacent the front transverse frame member 11 and attached thereto by laterally spaced, yieldable, angular connecting members 23. Each connecting member 23 comprises a pair of spaced metal angle plates 24 and 25 between which a yieldable element 26, preferably comprising resilient material such as rubber, is disposed. The rubber element 26 conforms in shape with the contour of the angle plates, and each of its opposite sides is bonded, preferably by vulcanization, to one of the metal angle plates, respectively. The angular connecting members 23 are so disposed as to position one leg of each thereof between the transverse frame member 11 and the rigid support 22. The other legs of the angular connecting members are disposed vertically, one adjacent each lateral extremity of the metal support 22, so as to yieldably oppose lateral movement of the support. The plates 25 of the angular connecting members are rigidly fixed by bolts 27 to a horizontal web 28 provided on the lower extremity of the metal support 22, and the plates 24 are rigidly fixed to a horizontal web of the transverse frame member 11 by bolts 29.

Formed on the upper extremity of the metal support 22 of the front mounting member 21 is an arcuate flange 30 on which is mounted an arcuate yieldable connecting member 31 comprising spaced metal plates 32 and 33, between which a resilient member 34, preferably comprising rubber, is disposed. Opposite sides of the rubber element 34 are bonded, preferably by vulcanization, to the adjacent surfaces of the plates 32 and 33, respectively. The lower plate 33 of the upper yieldable connecting element 31 is rigidly fixed to the flange 30 of the intermediate metal support 22 by bolts 35, and the upper plate 32 of this yieldable connecting element is rigidly fixed to a forwardly extending bracket 36 mounted on the crank case 15 of the engine unit. The upper plate 32 is rigidly fixed to the bracket 36 by bolts 37. The upper yieldable connecting element 31 is preferably disposed at an elevation substantially above the crank shaft 19 of the engine unit.

The front mounting member 21 supports the weight of the front end of the engine unit and, preferably, the entire remaining weight of the engine is supported by a rubber block 38 fixed to a metal plate 39, preferably by vulcanization, which is secured to the transverse frame member 12 by bolts 40. The rubber block 38 registers with and engages a substantially flat surface 41 of the lower side of the transmission casing 14. This rubber block may, if desired, be fixed to the flat face 41 or to the plate 39, or it may be fixed to both of these members depending upon the characteristics desired therein.

The front mounting member 21 and the rear support 38 are preferably so constructed and arranged as to position the engine unit at an inclination to a horizontal plane, thereby bringing the axis of the crank shaft 19 to an inclined relationship with respect to a horizontal plane of the chassis. This is accomplished by predetermining the height of the intermediate rigid support 22 of the front mounting member so as to position the upper yieldable connecting element 31 at the elevation with respect to the rear support 38 required to maintain the engine unit in the desired inclined relation. The angle of inclination of the unit with respect to a horizontal plane may vary within desired limits, a six degree angle of inclination being sufficient to properly position a fan 42, mounted on the front end of the crank shaft, in registration with a radiator core 43 of the cooling system of the engine. The front and rear mounting members 21 and 38, respectively, are also constructed and arranged so as to oscillatively support the engine unit about an axis 44, extending at an inclination of the crank shaft axis, and passing substantially through the center of mass, generally indicated at 45 in Fig. 1.

All tendency of the engine unit to shift rearwardly due to the inclination at which it is supported is opposed by a resilient abutment, preferably comprising a rubber block 46 disposed between and having its opposite sides rigidly bonded by vulcanization to opposite plates 47 and 48. This abutment is disposed between the rear side face of the bell housing 13 and the side of the transverse frame member 12, the plate 48 being rigidly secured to the transverse frame member 12 by bolts 50, and the plate 47 being rigidly secured to the bell housing 13 by bolts 51. This abutment is preferably disposed in a plane substantially normal to the axis of the crank shaft 18, and it acts in compression in opposing rearward movement of the engine unit and the tension in an opposing forward movement thereof. The rubber block of the resilient abutment is also preferably disposed at the longitudinal vertical plane of the engine unit which passes through the center of mass thereof so as to prevent twisting of the unit relative to its supporting frame, and displacement of the center of mass of the unit as the latter is urged rearwardly against the abutment.

An engine mounted as above set forth is permitted to oscillate in response to the torque reaction impulses thereof about an axis passing through its center of mass, and this movement of the engine, therefore, does not bring about substantial movement of the center of mass of the unit, and as a result objectionable side sway of the chassis frame structure, application of transversely directed shock thereon, and other characteristics of roughness of engine operation inuring from the torque reaction impulses are materially reduced, if not substantially eliminated.

The rubber blocks of the front and rear supports serve as sound insulating members and prevent the direct transmission of vibrations of sound frequency from the engine unit to the chassis frame and the vehicle body conventionally mounted thereon. The series relation of the front of the rubber weight supporting elements of the front mounting member 21 substantially minimizes the transmission of sound vibrations through the front mounting member from the engine unit to the frame structure. The vibrations which are transmitted from the engine to the intermediate rigid support 22 by the rubber 34 do not correspond in frequency with the natural frequency of vibration of the rigid intermediate support, and the vibrations transmitted from the latter support to the chassis frame structure by the rubber blocks 26 of the lower angular connecting element 23 do not correspond in frequency with the natural frequency of the chassis structure. Therefore, synchronizing of the vibration impulses with the natural vibration frequency of the various structures through which such impulses are transmitted is guarded against at spaced locations by a series arrangement of yieldable weight supporting elements.

By placing some of the yieldable material of an engine mounting member at both extremities of a rigid intermediate part of the mounting member, respectively, it is possible to embody in the latter a greater thickness of yieldable sound insulating material between supporting and supported structures than could otherwise be accommodated in the space, for example, at the upper end of the rigid intermediate part of the mounting which is usually highly congested in conventional motor vehicles. The yieldable weight supporting element of mounting elements of this character must be sufficiently yieldable to accommodate oscillatory movement of the engine unit in response to the torque reaction impulses, and they are also relied upon to hold the engine unit against excessive lateral movements in directions normal to its length. In order to properly accomplish these functions, it sometimes becomes impossible to employ resilient elements of proper character for efficiently insulating the mounting against the transmission of sound vibrations from the engine unit to the chassis frame structure. This difficulty is conveniently overcome in a mounting member of the character shown at the front of the above assembly in which, the connecting elements 23 are constructed and arranged so as to efficiently operate as sound insulating means while at the same time opposing lateral movement of the mounting member with respect to the chassis frame.

The natural vibration frequency of the engine unit upon its mountings is influenced by the characteristics of the rubber in the front and rearward mountings. As these elements are called upon to accomplish definite functions, such as supporting the weight of the engine and limiting its movement within a predetermined desired range, they cannot also always be provided with those properties which are required to bring the natural vibration frequency of the engine to a desired low value. When this condition exists, the natural vibration frequency of the engine is predetermined by allowing resilient means to coact between the engine and the chassis frame. In the illustration shown in Figs. 1, 2, and 3, a torque opposing member 52 is mounted on the right side of the engine unit as viewed from the rear thereof. This torque opposing member includes a rubber block 53 having a metal plate 54 bonded, preferably by vulcanization, to one of its sides, and secured to the left side wall of the transmission casing 14. Rigidly bonded to the opposite side of the rubber block 53 is a metal plate 55 which is secured by bolts 56 to a bracket 57, carried by the transverse frame member 12. The rubber block 53 is preferably positioned in lateral alignment with the axis 54, as illustrated in Fig. 3, and portions of the block 53 extend above and below the elevation of the axis 54 at this section of the unit. This arrangement of the torque opposing member 52 causes portions of the rubber block 53 to act in tension, and portions thereof to act in compression in opposing oscillatory movement of the unit. The torque opposing member 52 also yieldably opposes lateral movement of the rear end of the engine unit in directions transverse of its length.

In some motor mounting installations it is desirable to distribute the forces opposing oscillatory movement of the unit between locations at the front and rear end portions thereof. In this instance, an oscillatory torque opposing member 58 is disposed between the front transverse frame member 11 and the front end of the engine unit, as illustrated in Fig. 1. The oscillatory torque opposing member 58 includes a pair of spaced plates 59 and 60, between which a rubber block 61 is disposed. The opposite sides of the rubber block 61 are integrally bonded to the adjacent surfaces of the plates 59 and 60 which are rigidly fixed to the front end of the engine unit and to the transverse frame member 11, respectively. The oscillatory torque opposing member 58 assists in predetermining the natural frequency of oscillation of the unit about the axis 44 and also opposes movement of the front end portion of the engine unit in diverse directions normal to its length.

In the form of the invention shown in Fig. 4, a torque opposing member 52' including a rubber block 53' having plates 54' and 55' rigidly bonded to its opposite sides is located on the right side of the engine unit as viewed from the rear thereof. Portions of the rubber block 53' extend above and below the elevation of the axis at the section of the unit in which the torque opposing member is located, and this member acts in substantially the same manner described in connection with the structure shown in Fig. 3.

In the form of the invention shown in Fig. 5, the entire weight of the internal combustion engine is supported on longitudinally spaced, yieldable mounting members in the manner shown in Fig. 1, but oscillatory movement of the engine is opposed by a pair of torque opposing members 62 and 63 located on opposite sides of the transmission casing 14, respectively. The torque opposing member 62 includes an angle bracket 64 fixed to the transmission casing 14, and a pair of spaced plates 65 and 66 fixed to the bracket 62 and transverse frame member 12, respectively, between which a rubber block 67 is disposed. The rubber block is rigidly bonded to the adjacent faces of the plates 65 and 66 and is disposed at an inclination to a horizontal plane. The torque opposing member 63 also includes a rubber block 68 which is inclined in an opposite direction with respect to a horizontal plane and bonded at its respectively opposite sides to metal plates 69 and 70. The lower plate 70 is rigidly fixed to the transverse frame member 12, and the upper plate 69 is provided with a threaded shank 71 which is received in an aperture formed in a bracket 72 mounted in the left side wall of the transmission casing 14. Threaded on the stem 71 are nuts 73 by which the upper plate 69 may be adjustably positioned with respect to the bracket 72.

In torque opposing apparatus of this character, it is preferably to relieve the resilient elements thereof of substantially all of the weight of the engine. This may be conveniently accomplished by adjustment of the upper plate 69 of the left torque opposing member 63, so as to place the rubber blocks 69 and 37 of the members 63 and 62, respectively, under tension, thereby urging the engine unit downwardly upon the rear support 40. In the event that the rear support 40 takes a permanent set, or in any way varies after the mounting is assembled, such changes may be readily compensated for by adjusting the position of the threaded stem 71 of the torque opposing member 63 with respect to the bracket 72. When it is desired to rely upon the rubber blocks 67 and 68 to assist in yieldably opposing fore and aft movement of the engine unit, the upper plates 65 and 69 thereof may be brought to a channel shape and provided with side flanges 74 and 75, respectively, as illustrated in Fig. 5.

Although but several specific embodiments of the invention are herein shown and described, it will be understood that various changes in the size, shape, and arrangement of parts may be made without departing from the spirit of my invention, and it is not my intention to limit its scope other than by the terms of the appended claims.

What I claim is:

1. A mounting for an internal combustion engine including a frame structure, means on said frame structure oscillatively supporting said engine unit including spaced yieldable weight supporting elements constructed and arranged to sustain substantially the entire weight of said engine unit, and oscillatory movement opposing members on opposite sides of said unit, each having a resilient element yieldably coacting between said unit and said frame structure and so constructed and arranged as to accommodate oscillatory movement of said engine in shear, one of said members being adjustable in a direction transverse to the direction of the shear stresses of its resilient element and having means for normally holding portions thereof in selected positions relative to said frame structure and unit so as to relieve said resilient means of substantially all the weight of said engine unit and to predetermine the shear resisting properties thereof by variation in its tension.

2. A mounting for an internal combustion engine including a frame structure, means on said frame structure oscillatively supporting said engine unit including spaced yieldable weight supporting elements constructed and arranged to sustain substantially the entire weight of said engine unit, and oscillatory movement opposing means including members on opposite sides of said unit, each having a rubber element connected with said frame structure and engine unit respectively and tensionally urging said unit toward its weight supporting elements, said rubber elements being so constructed and arranged as to accommodate oscillatory movement of said engine in shear, at least one of said members being provided with means for predetermining the shear resisting properties thereof by varying the tension of said rubber elements.

ROGER K. LEE.